Jan. 1, 1929.
J. SKUBIC
BREAD KNIFE
Filed May 22, 1925
1,697,091
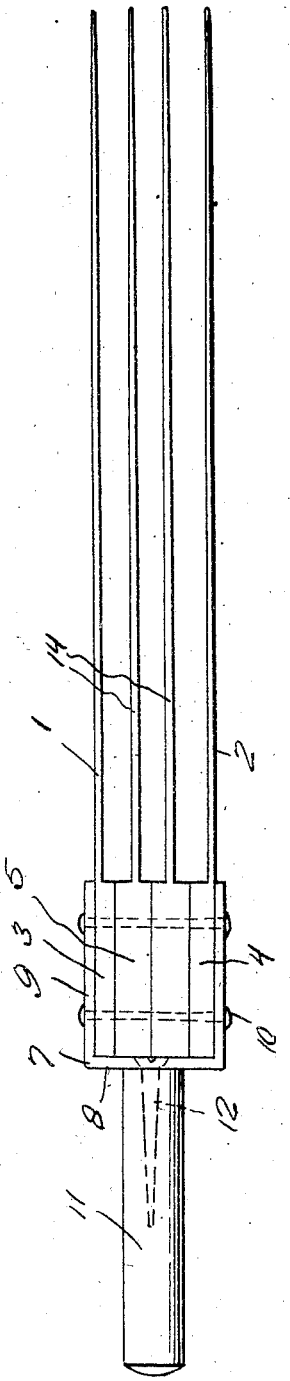
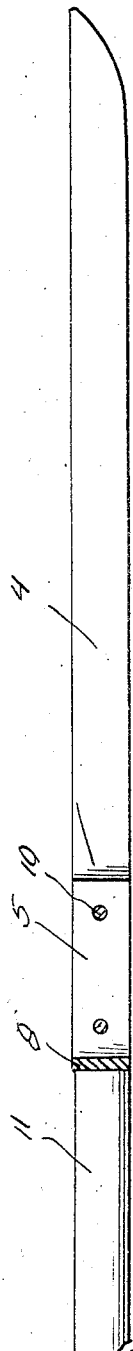
Inventor
Joseph Skubic.
By Clarence A. O'Brien
Attorney Patented Jan. 1, 1929.

1,697,091

UNITED STATES PATENT OFFICE.

JOSEPH SKUBIC, OF BIWABIK, MINNESOTA.

BREAD KNIFE.

Application filed May 22, 1925. Serial No. 32,071.

The present invention relates to bread knives, and has for its principal object to provide a structure whereby it is possible to cut several slices of bread in one operation.

Another important object of the invention is to provide a knife of this nature which includes a plurality of blades disposed in parallel spaced relation, and having thickened shanks which are held within a U-shaped supporting member, to which is attached a handle.

A still further important object of the invention is to provide a knife of this nature which may be easily and quickly assembled and consist of parts which are simple, strong, and durable, and the device is capable of being manufactured at a relatively low cost.

Another important object of the invention is to provide a knife of this nature which will prove thoroughly reliable and efficient in use.

With the above and numerous other objects in view, as will appear as the description proceeds, the invention resides in certain novel features of construction, and in the combination and arrangement of parts as will be hereinafter more fully described and claimed.

In the drawing:—

Figure 1 is a top plan view of the knife embodying the features of my invention, and Figure 2 is a longitudinal section taken therethrough.

Referring to the drawing in detail, it will be seen that 1 designates one end knife blade, and 2 the other end knife blade. These end blades 1 and 2 are provided with shanks 3 and 4 respectively which are thicker than the blades. It is to be noted that the blades 1 and 2 are disposed substantially flush with the outer sides of the respective shanks. The intermediate blades are indicated by the numerals 4, and are provided with shanks 5 which are approximately twice as thick as shanks 3 and 4, and the blades 4 extend in alignment with the median dimension of the shank 5. The shanks 3, 4, and 5 are provided with registering openings. A U-shaped supporting member 7 includes the intermediate straight portion 8, and the straight sides 9 between which are disposed the shanks 3, 4 and 5. Pins, or other suitable fastening devices 10 pass through the sides 9 and through the openings provided in the shanks 3, 4 and 5. A handle 11 extends from the central portion of the intermediate portion 8 and is held in place by means of a screw 12 or any other suitable fastening element. It is to be noted that the blades 1, 2 and 4 extend in spaced parallel relation, and thus it is possible in one operation to cut several slices of bread. This allows a loaf of bread to be cut up into slices in a relatively short space of time as compared to the operation when performed by a single bladed knife. The invention also allows the slices to be of a uniform thickness.

The present embodiment of the invention has been disclosed merely by way of example in order to disclose a practical form of the invention which will attain the features of advantage enumerated as desirable in the statement of the invention and the above description. It is obvious that numerous changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

A bread knife of the class described including a U-shaped integral supporting member comprising an intermediate straight portion having a central countersunk opening therein and a pair of straight sides rectangularly disposed on the ends of the intermediate straight portions, a plurality of blades having thickened shanks and arranged to extend in parallel spaced relation with the shanks in abutment with each other, said shanks of the intermediate blades being approximately twice the thickness of the shanks of the end blades, the blades extending from the intermediately disposed shanks being in alinement with the median dimensions of their respective intermediately disposed shanks, and the end blades being disposed flush with the other sides of their respective shanks, said shanks being receivable between the sides of the supporting member, fastening elements passing through the sides and through the shanks, a screw having its head embedded in the countersunk opening of the intermediate portion of the supporting member and being held in place by the shanks of the intermediately disposed blades, and a handle engaged on said screw and extending from the intermediate portion of the supporting member in an opposite direction than the sides thereof.

In testimony whereof I affix my signature.

JOSEPH SKUBIC.